Dec. 30, 1924.

H. L. TURNEY

CLUTCH MECHANISM

Filed Dec. 2, 1919

1,520,733

2 Sheets-Sheet 1

Inventor
Harry L. Turney
By H. L. ——
atty

Dec. 30, 1924.

H. L. TURNEY 1,520,733

CLUTCH MECHANISM

Filed Dec. 2, 1919

2 Sheets-Sheet 2

Inventor
Harry L. Turney
By

Patented Dec. 30, 1924.

1,520,733

UNITED STATES PATENT OFFICE.

HARRY L. TURNEY, OF PORTLAND, OREGON.

CLUTCH MECHANISM.

Application filed December 2, 1919. Serial No. 341,954.

*To all whom it may concern:*

Be it known that I, HARRY L. TURNEY, a citizen of the United States, residing at Portland, in the county of Multnomah and State of Oregon, have invented new and useful Improvements in Clutch Mechanism, of which the following is a specification.

The clutch mechanism is a very desirable one for logging engines and is so exemplified in the present application.

It is desirable in logging engines to have the main drum so arranged that it can be driven at two speeds from the same drive shaft. This is particularly true where there are other drums driven from this drive shaft because the secondary drums should be driven ordinarily at their maximum speeds at all times. It is also desirable that the mechanism may be such as to permit of the change of speed of the main drum while the drum is in motion. The construction to accomplish this purpose must be rugged because engines of this type are subjected to very severe use. With this invention the main drum is provided with varying speeds and the speed of the drum may be changed while in motion. The mechanism is rugged and of simple construction.

The invention is illustrated in the accompanying drawings as follows:—

Figure 1:
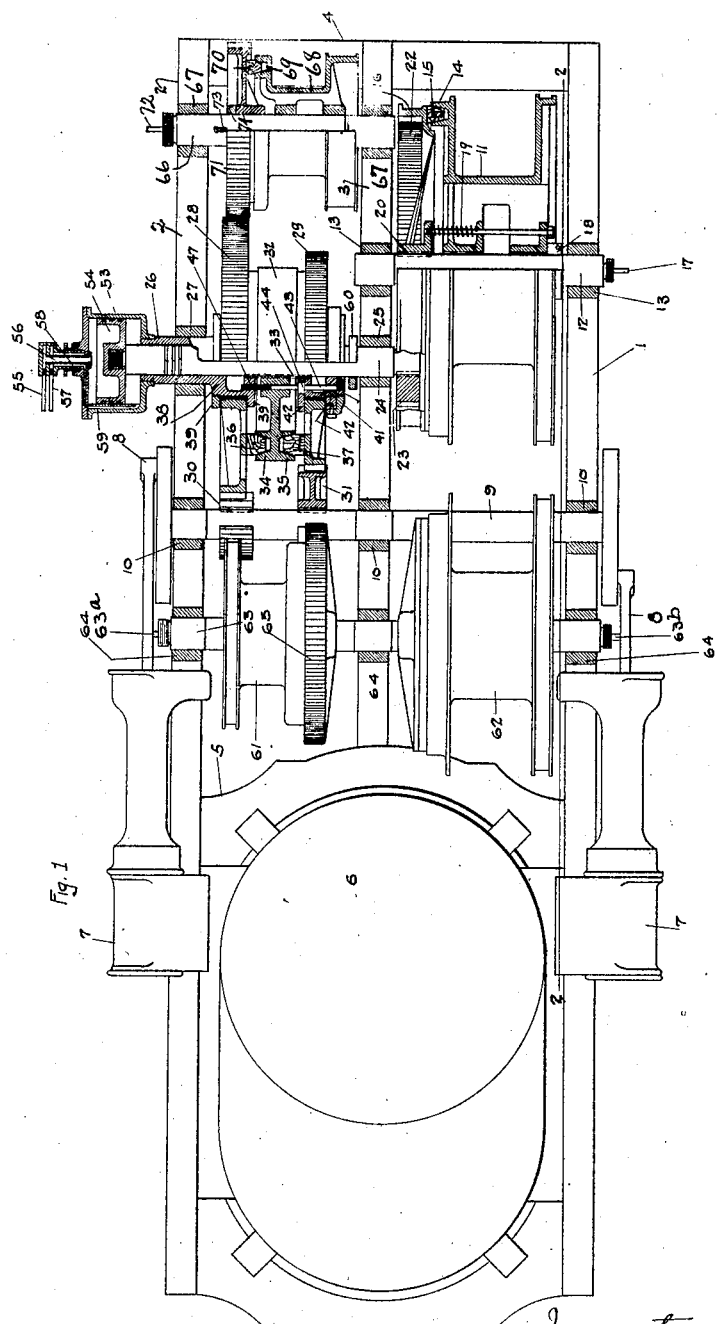

Fig. 1 shows a plan view, partly in section, of the engine.

Figure 3:
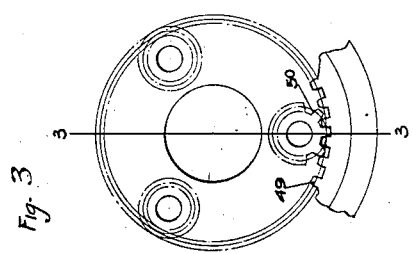
Figure 2:
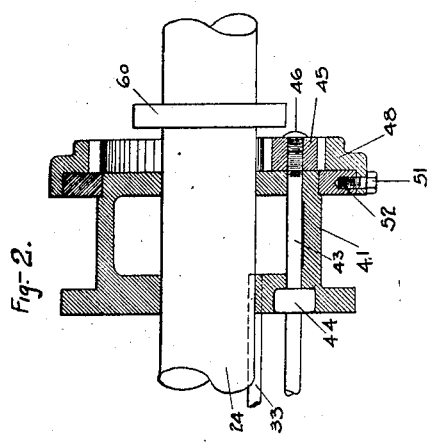

Fig. 2 a vertical section of the adjusting mechanism for clutch clearance on the line 3—3 in Fig. 3.

Fig. 3 an end view of the mechanism shown in Fig. 2.

The frame is made up of the side beams 1 and 2, a centrally located longitudinal beam 3 and connecting beams 4 and 5.

The engine is provided with the usual boiler 6. Engines 7 are mounted on the side beams. The engines operate on the cranks 8 and operate the drive shaft 9. The drive shaft 9 is mounted in bearings 10 mounted on the beams 1, 2 and 3.

The main drum 11 is journaled on a shaft 12. The shaft 12 is journaled in bearings 13 on the beams 1 and 3. The drum is provided with a friction surface 14 operating against the friction blocks 15 on the gear wheel 16. A friction operating pin 17 extends into the end of the shaft 12 and may be operated by any friction actuating mechanism desired (not shown). The pin 17 operates on a cross plate 18. The plate 18 operates the drum and moves it axially on the shaft so as to move the friction surface into engagement. A spring 19 shifts the drum to move the friction surface out of engagement when the friction device operating on the pin 17 is released. The gear wheel 16 is locked on the shaft 12 by means of a key 20. The gear wheel is provided with an internal gear 22 and a pinion 23 meshes with the gear 22. The pinion 23 is mounted on an intermediate shaft 24. The intermediate shaft is journaled in bearing 25 on the beam 3 and is supplied with a sleeve 26 which is journaled in a bearing 27 on the beam 2. Gears 28 and 29 are journaled on the shaft 24 and these gears mesh with gears 30 and 31 fixed on the drive shaft 9. The gear ratio of the gears 28 and 30 differs from the gear ratio of the gears 29 and 31, the gear 31 being larger than the gear 30 and drives the gear 29 at a higher speed than the gear 28. For convenience, therefore, the gears 29 and 31 are designated as the high speed gears.

A driver mounting 32 is locked on the shaft 24 by means of a key 33. It is provided with opposing friction drivers 34 and 35. A friction clutch 36 on the gear 28 operates on the friction drivers 34 and clutch 37 on the gear 29 operates on the friction driver 35. The sleeve 26 has an enlarged extension 38 on which the gear 28 is journaled. It is provided with shoulders 39 so that the gear is forced to move axially with the sleeve 26. A bushing 41 is arranged on the shaft 24 within the gear 29 and is provided with shoulders 42. The shoulders force the gear 29, therefore, to move with the bushing 41. The bushing is movable axially on the shaft 24 and the bushing 41 as well as the sleeve 26 are locked against turning on the shaft 24 by means of the key 33 which is extended so as to lock these parts. A rod 43 extends through the bushing 41. It is provided with a shoulder 44 at one end and a nut 45 is secured to the opposite end, the rod being headed over at 46 so as to fix the nut on the rod. There are preferably three of these rods arranged equidistant as shown in Fig. 3. The rods extend through the driver mounting 32 and into the sleeve 26. The rods are screw-threaded at 47.

It will be seen that by turning the rods the distance between the bushing 41 and the extension 38 may be varied as desired. This variation in distance varies the distance between the clutches 36 and 37 and consequently the clearance between these clutches and their drivers. This provides a very convenient adjustment of this clearance.

In order to adjust all the rods together I have provided the ring 48 which has an internal gear 49. This internal gear meshes with the gear teeth 50 with which the nuts 45 are provided. It will be readily seen that by turning the ring 48 all the rods are rotated together and consequently the movement is communicated to all parts of the bushing and sleeve. The ring is provided with a locking screw 51 which extends into the shoulder 42, the screw extending into an opening 52 in the shoulder 42, the shoulder being provided with a series of openings 52 equally spaced. A steam cylinder 53 is mounted on the sleeve 26 outside the bearings 27. A piston 54 is arranged in the cylinder and secured directly to the shaft 24. Steam is admitted to both ends of the cylinder by way of the pipe 55 and passage 56 to the outer end of the cylinder and by way of the pipe 57, passage 58 and passage 59 to the inside of the cylinder.

The shaft 24 is locked against axial movement by means of the gear 23 and the collar 60 arranged on the inside of the bearing 25.

It will be observed that when steam is thrown on the outer end of the cylinder, the cylinder moves outwardly and this carries with it the sleeve 26, rods 43, bushing 41, gear 29 and clutch 37 into engagement. The same movement increases the clearance between the driver 34 and clutch 36. When, however, steam is admitted to the inner end of the cylinder, the cylinder 53 is moved inwardly and this acting through the sleeve 26 and extension 38 carries the clutch 36 into engagement with the driver 34. It will be noted that if the drivers are brought to a neutral position the gears will run free. It will further be noted that the friction clutches are positively disengaged through the direct action of the steam in the cylinder and the thrust is sustained entirely by the shaft. The construction is very rugged and permits of a shift from one speed to another while the engine is in motion. This is very important in that it is desirable to give the highest speed practical and still have sufficient power to move the load. Further this is accomplished with an engagement of only one gear on the main drum and this permits of the shortening and simplifying of the frame.

I prefer to provide the mechanism with auxiliary drums 61 and 62. These are mounted on the shaft 63, this shaft being carried in bearings 64 and driven by a gear 65 which meshes with the gear 31. The drums are actuated through friction thrust pins 63$^a$ and 63$^b$ in the usual manner.

I prefer to provide a heel block drum and the construction hereinbefore described readily lends itself to the inclusion of such a drum. A shaft 66 is journaled in bearings 67, the bearings being carried by the beams 2 and 3. A drum 68 is fixed on the shaft 66. It has a friction surface 69 which is adapted to engage a friction surface 70 on the gear 71. The gear 71 meshes with the gear 28. A friction device 72 operates through a thrust pin 73 and thrust collar 74 in the usual manner.

It will be observed that the gear 28 is running continuously and consequently the gear 71 is kept in motion so that regardless of whether the drum 11 is being driven or whether it is being driven through the gear 28 or 29 the drum 68 is available. It will be also observed that the drum 68 occupies a space immediately in front of the gears 28 and 29 and also an available space at the side of the drum. This is important in that the close coupling of the different mechanisms so as to reduce the size of the machine as a whole is of great importance.

What I claim as new is:—

1. In a clutch mechanism, the combination of a shaft, bearings for said shaft; two gearings mounted on the shaft; drivers mounted on the shaft; clutches between the drivers and gearings; actuating mechanism on the end of the shaft; means communicating the movement of the mechanism through a bearing and without the shaft to the clutches positively in both directions to set and release the clutches, said means and the shaft being directly opposed from the mechanism to the clutches in sustaining the thrust of the mechanism.

2. In a clutch mechanism, the combination of a shaft; bearings for the shaft; two gearings; drivers acting on the gearings fixed on the shaft; mountings for the gearings permitting a rotating and sliding movement of the gearings relatively to the shaft; actuating mechanism mounted on the end of the shaft; and means without the shaft fixedly connecting the gearings and the mechanism, said means extending through a bearing and directly opposed to the shaft in sustaining the thrust of the mechanism.

3. In a clutch mechanism, the combination of a shaft; bearings for said shaft; two gearings mounted on said shaft; drivers acting with said gearings mounted on said shaft; clutches between the drivers and gearings; actuating mechanism on the end of the shaft for positively moving the drivers and gearings relatively to each other to actuate said clutches and drivers relatively comprising a sleeve slidingly mounted on the shaft and extending through a bearing, and devices for moving the sleeve and shaft relatively to each other to communicate the relative movement to the gearings and drivers to move the clutches into engagement.

4. In a clutch mechanism, the combination of a shaft; bearings for said shaft; two gearings mounted on said shaft; drivers acting with said gearings mounted on said shaft; clutches between the drivers and gearings; actuating mechanism on the end of the shaft for positively moving the drivers and gearings relatively to each other to actuate said clutches and drivers relatively comprising a sleeve slidingly mounted on the shaft and extending through a bearing; and devices for moving the sleeve and shaft relatively to each other to communicate the relative movement to the gearings and drivers to move the clutches and drivers relatively into and out of engagement.

5. In a clutch mechanism, the combination of a shaft; two gearings mounted on said shaft; drivers acting with said gearings arranged between said gearings on the shaft, said drivers being fixed relatively to the shaft; mountings for the gearings permitting a rotating and sliding movement of the gearings relatively to the shaft; a sleeve mounted on the shaft connected with one of the gearings; means for moving the shaft and sleeve relatively to each other; a connection between the gearings, comprising a plurality of rods; screw adjusting devices operating in connection with said rods; and means for actuating said devices simultaneously.

6. In a clutch mechanism, the combination of a shaft; two gearings on the shaft; drivers acting with said gearings mounted on the shaft; clutches between the drivers and gearings; actuating mechanism for said clutches operating from one end of the shaft, said mechanism moving said clutches and drivers relatively and positively into and out of engagement and comprising rods communicating the movement of the mechanism through a gearing; screw devices for adjusting said rods to adjust said clutches; and means for actuating said devices simultaneously.

7. In a clutch mechanism, the combination of a shaft; two gearings on the shaft; drivers acting with said gearings mounted on the shaft; clutches between the drivers and gearings; actuating mechanism for said clutches operating from one end of the shaft, said mechanism moving said clutches and drivers relatively and positively into and out of engagement and comprising rods communicating the movement of the mechanism through a gearing; screw devices for adjusting said rods to adjust said clutches; means for actuating said devices simultaneously; and means for locking said screw devices in adjustment.

8. In a clutch mechanism, the combination of a shaft; two gearings on the shaft; drivers acting with said gearings mounted on the shaft; clutches between the drivers and gearings; actuating mechanism for said clutches operating from one end of the shaft, said mechanism moving said clutches and drivers relatively and positively into and out of engagement and comprising rods communicating the movement of the mechanism through a gearing; screw devices for adjusting said rods to adjust said clutches; and means for actuating said screw devices simultaneously comprising a gear for each device and a common gear operating on said gears.

9. In a clutch mechanism, the combination of a shaft; two gearings on said shaft; drivers acting with said gearings mounted on said shaft and arranged between the gearings on the shaft, said drivers being fixed relatively to the shaft; clutches between the drivers and the gearings; mountings for the gearings permitting a rotative and sliding movement relatively to the shaft; a sleeve mounted on the shaft connected with one of the gearings; means for moving the shaft and sleeve relatively to each other; a connection between the gearings comprising a plurality of rods; a screw adjustment operating through the rotation of said rods; means for rotating said rods simultaneously; and devices on said rods for compelling a movement of the gearings with the rods in both directions whereby the clutches are positively thrown into and out of engagement by a relative movement of the sleeve and shaft.

In testimony whereof I have hereunto set my hand.

HARRY L. TURNEY.